(12) United States Patent
Yanagi et al.

(10) Patent No.: US 12,669,178 B2
(45) Date of Patent: Jun. 30, 2026

(54) METHOD FOR MANUFACTURING SEALING STRUCTURE AND SEALING STRUCTURE

(71) Applicant: NOK CORPORATION, Tokyo (JP)

(72) Inventors: Tokunori Yanagi, Shizuoka (JP);
Takumi Tomatsu, Shizuoka (JP);
Hayato Kamimura, Shizuoka (JP)

(73) Assignee: NOK CORPORATION (JP)

( * ) Notice: Subject to any disclaimer, the term of this patent is extended or adjusted under 35 U.S.C. 154(b) by 0 days.

(21) Appl. No.: 19/227,670

(22) Filed: Jun. 4, 2025

(65) Prior Publication Data

US 2025/0377040 A1 Dec. 11, 2025

(30) Foreign Application Priority Data

Jun. 7, 2024 (JP) ................................. 2024-093049

(51) Int. Cl.
*F16J 15/32* (2016.01)
*F16J 15/3204* (2016.01)
*F16K 11/02* (2006.01)

(52) U.S. Cl.
CPC ........... *F16J 15/3204* (2013.01); *F16K 11/02* (2013.01)

(58) Field of Classification Search
CPC ... F16J 15/3204; F16J 9/14; F16J 9/24; F16K 11/02; F16K 11/188
See application file for complete search history.

(56) References Cited

U.S. PATENT DOCUMENTS

| | | | | |
|---|---|---|---|---|
| 1,187,811 A | * | 6/1916 | Burdick | F16J 9/14 |
| | | | | 277/494 |
| 1,360,535 A | * | 11/1920 | Kelly | F16J 9/24 |
| | | | | 277/486 |
| 1,750,381 A | * | 3/1930 | Baker | F16J 9/14 |
| | | | | 277/446 |
| 2,055,153 A | * | 9/1936 | Madsen | F16J 9/14 |
| | | | | 277/486 |
| 2,590,961 A | * | 4/1952 | Green | F16J 9/14 |
| | | | | 277/494 |
| 10,704,507 B2 | * | 7/2020 | Ishigaki | F02M 26/67 |
| 2006/0214017 A1 | | 9/2006 | Vacca et al. | |

(Continued)

FOREIGN PATENT DOCUMENTS

| | | |
|---|---|---|
| CN | 115727166 A | 3/2023 |
| DE | 102022115697 A1 | 12/2023 |
| JP | 2006-512547 A | 4/2006 |

OTHER PUBLICATIONS

Extended European Search Report for corresponding European Patent Application No. 25181318.4 dated Sep. 29, 2025, 9 Pages.

*Primary Examiner* — Christine M Mills
*Assistant Examiner* — L. Susmitha Koneru
(74) *Attorney, Agent, or Firm* — Harness, Dickey & Pierce, P.L.C.

(57) ABSTRACT

A method of manufacturing a sealing structure includes: accommodating in an inner space of a housing member a flat plate-shaped seal member including a first end face and a second end face located on opposite sides to each other, while the seal member being in a curved state such that the first end face and the second end face are close to each other; installing an auxiliary member to be in contact with the first end face and the second end face between the first end face and the second end face; and accommodating a shaft member inside the seal member.

9 Claims, 15 Drawing Sheets

(56) References Cited

U.S. PATENT DOCUMENTS

| | | | |
|---|---|---|---|
| 2018/0258889 A1* | 9/2018 | Ishigaki | ................ F16K 1/2268 |
| 2024/0052928 A1 | 2/2024 | Tadano et al. | |
| 2024/0344621 A1 | 10/2024 | Wang et al. | |

* cited by examiner

METHOD FOR MANUFACTURING SEALING STRUCTURE AND SEALING STRUCTURE

CROSS REFERENCE TO RELATED APPLICATION

This application is based on, and claims priority from, Japanese Patent Application No. 2024-93049, filed Jun. 7, 2024, the entire content of which is incorporated herein by reference.

BACKGROUND

Technical Field

The present disclosure relates to sealing structures and to methods of manufacturing the same.

Description of Related Art

A valve device for switching the flow path of a fluid utilizes a seal for sealing the fluid. For example, Japanese Translation of PCT International Application Publication No. JP-T 2006-512547 discloses a fluid circulation system in which a rotatable adjustment member is accommodated in a cylindrical body, in which an arcuate seal ring is installed between an inner wall face of the cylindrical body and an outer wall face of the adjustment member.

In JP-T 2006-512547, a seal ring formed in an arc shape takes up space during transportation, and therefore, it is difficult to reduce transportation cost, which is a drawback.

SUMMARY

In view of the above circumstances, an aspect of the present disclosure is to reduce transportation cost of a seal member for use in a sealing structure and also reduce costs associated with manufacturing the sealing structure.

A method of manufacturing a sealing structure according to an aspect of the present disclosure includes accommodating in an inner space of a housing member a flat plate-shaped seal member including a first end face and a second end face located on opposite sides to each other, while the seal member being in a curved state such that the first end face and the second end face are close to each other; installing an auxiliary member to be in contact with the first end face and the second end face between the first end face and the second end face; and accommodating a shaft member inside the seal member.

A sealing structure according to an aspect of the present disclosure includes: a housing member having an inner space; a shaft member accommodated in the inner space; a sealing member including a first end face and a second end face located on opposite sides to each other, and disposed between an inner peripheral surface of the housing member and an outer peripheral surface of the shaft member, while being in a curved state such that the first end face and the second end face are close to each other; and an auxiliary member disposed between the first end face and the second end face.

BRIEF DESCRIPTION OF THE DRAWINGS

FIG. 3 shows a plan view and a cross-sectional view of the seal member as viewed from the direction of a second surface thereof.

FIG. 4 is a plan view of a seal member as viewed from the direction of a first surface thereof.

FIG. 7 is an explanatory view of a step of accommodating the seal member in an inner space of the housing member.

FIG. 10 is a perspective view of the auxiliary member.

FIG. 17 is a cross-sectional view of the housing member and the seal member according to a modification.

DESCRIPTION OF THE EMBODIMENTS

A: Embodiment

Figure 1:
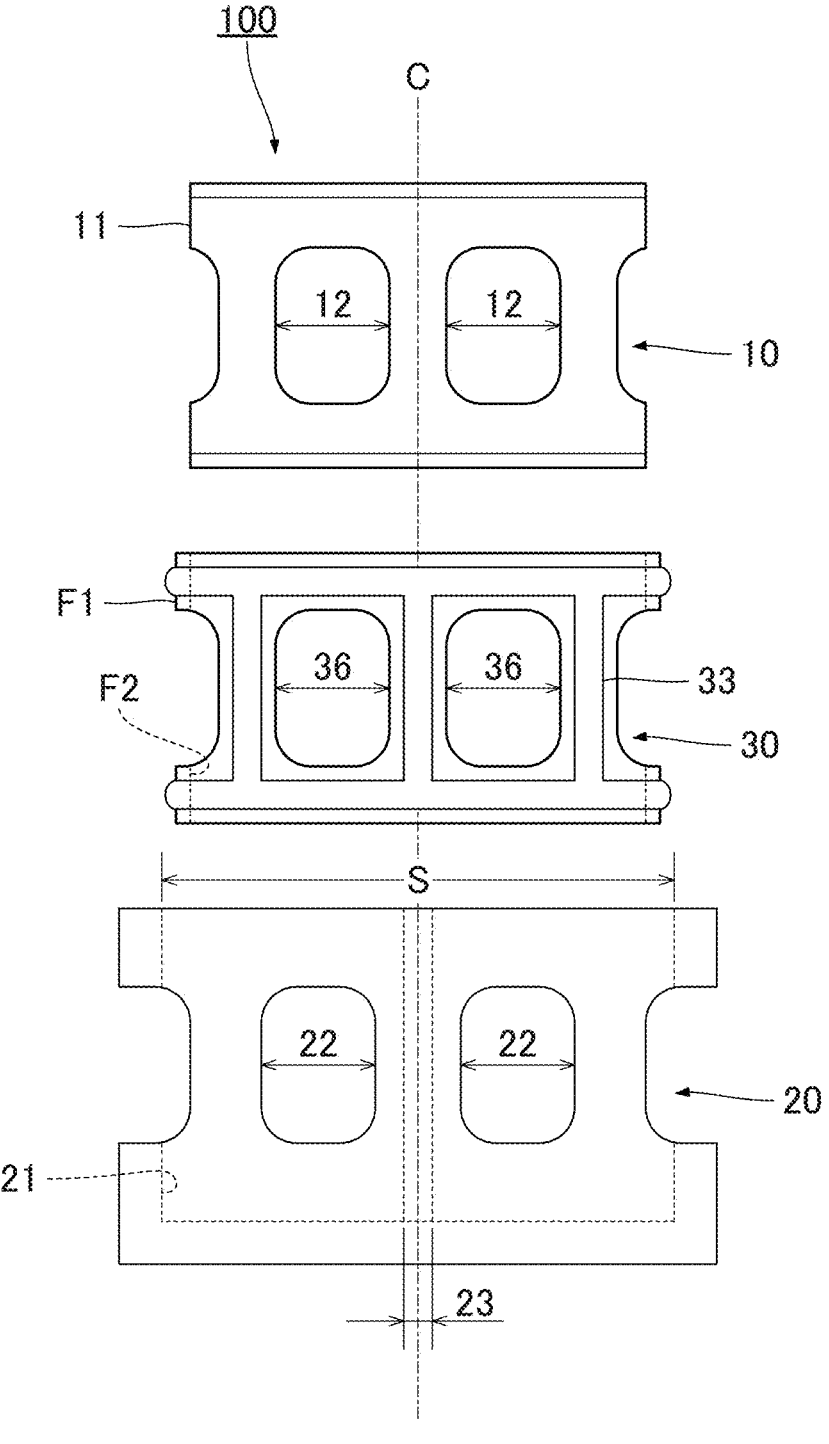
FIG. 1 is an exploded side view of a valve device according to a first embodiment.
Figure 2:
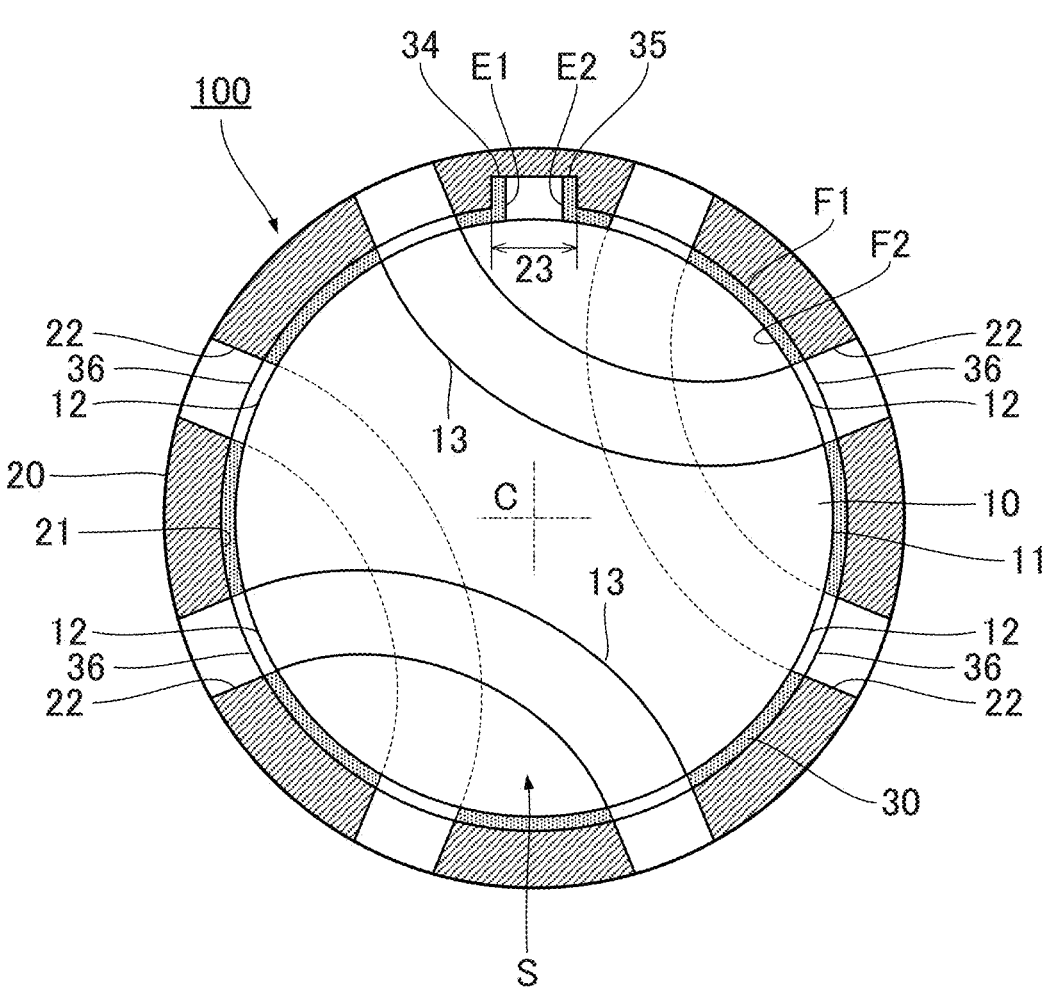
FIG. 2 is an explanatory view of a valve device.

FIG. 1 is an exploded side view of a valve device 100, employing a sealing structure, according to one aspect of the present disclosure. FIG. 2 is a cross-sectional view schematically illustrating a structure of the valve device 100. The valve device 100 is a control valve that controls a flow path of a fluid. Specifically, the valve device 100 is mounted on an automobile as a multi-control valve that switches a flow path of the cooling liquid, for example. As illustrated in FIGS. 1 and 2, the valve device 100 includes a shaft member 10, a housing member 20, and a seal member 30.

The shaft member 10 is a rotor that is rotatable about a rotation axis C. The shaft member 10 of the present embodiment is a columnar member. The housing member 20 is a hollow housing that houses the shaft member 10. Formed in the housing member 20 is an inner space S for accommodating the shaft member 10. The inner space S is a columnar space centered on the rotation axis C. It is to be noted that the shape of the shaft member 10 and that of the inner space S is not limited to a cylindrical shape. For example, the shaft member 10 and the inner space S may have a shape such as a truncated cone shape or a spherical shape.

The seal member 30 is a sealing device that seals a gap between the shaft member 10 and the housing member 20. Specifically, the seal member 30 is installed in an annular gap between an outer peripheral surface 11 of the shaft member 10 and an inner peripheral surface 21 of the housing member 20. As will be understood from the above description, the rotation axis C corresponds to the central axis of the seal member 30.

In the following description, a direction along a circumference of a virtual circle having any diameter centered on the rotation axis C is referred to as a "circumferential direction", and a direction of a radius of the virtual circle is referred to as a "radial direction". A radial direction toward the rotation axis C is referred to as "inward", and a radial direction away from the rotation axis C is referred to as "outward". The direction of the rotation axis C is an example of the "axial direction".

As illustrated in FIGS. 1 and 2, a plurality of openings 12 is formed in the outer peripheral surface 11 of the shaft member 10. The openings 12 are circumferentially spaced apart from each other. A plurality of flow channels 13 is formed inside the shaft member 10. Each of the plurality of the flow channels 13 is a passage that communicates two openings 12 with each other.

A plurality of openings 22 is formed in the inner peripheral surface 21 of the housing member 20. The openings 22 are circumferentially spaced apart from each other. In a state in which an opening 12 and an opening 22 face each other, a fluid flows between the opening 12 and the opening 22. The combination of an opening 12 and an opening 22 facing each other varies depending on a rotation angle of the shaft member 10 about the rotation axis C. That is, the shaft member 10 of the present embodiment functions as a valve element for switching the fluid flow channel 13. The seal member 30 is a resilient body for sealing the liquid passing between the opening 12 and the opening 22 in the flow path.

Figure 3:
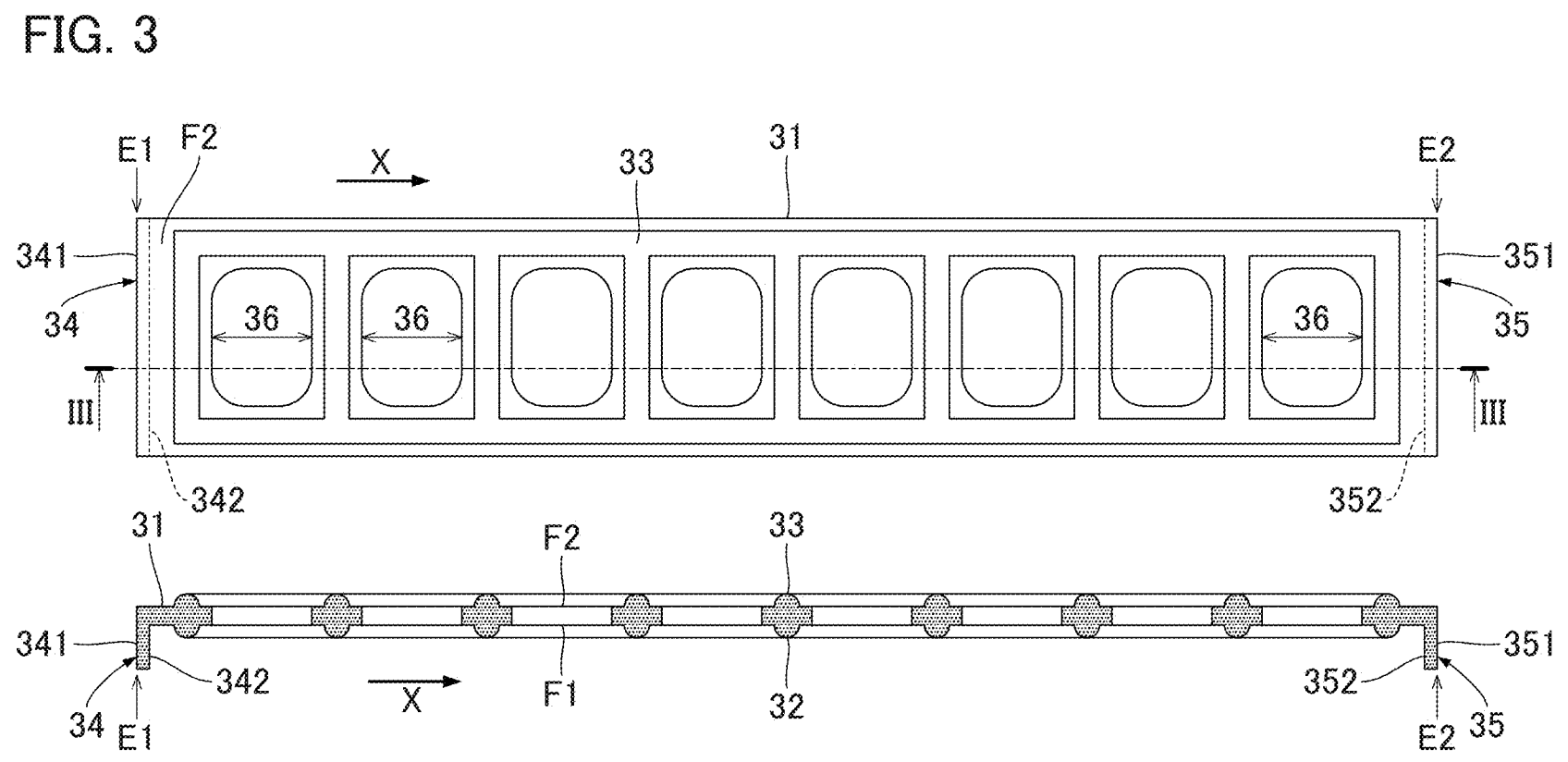
Figure 4:
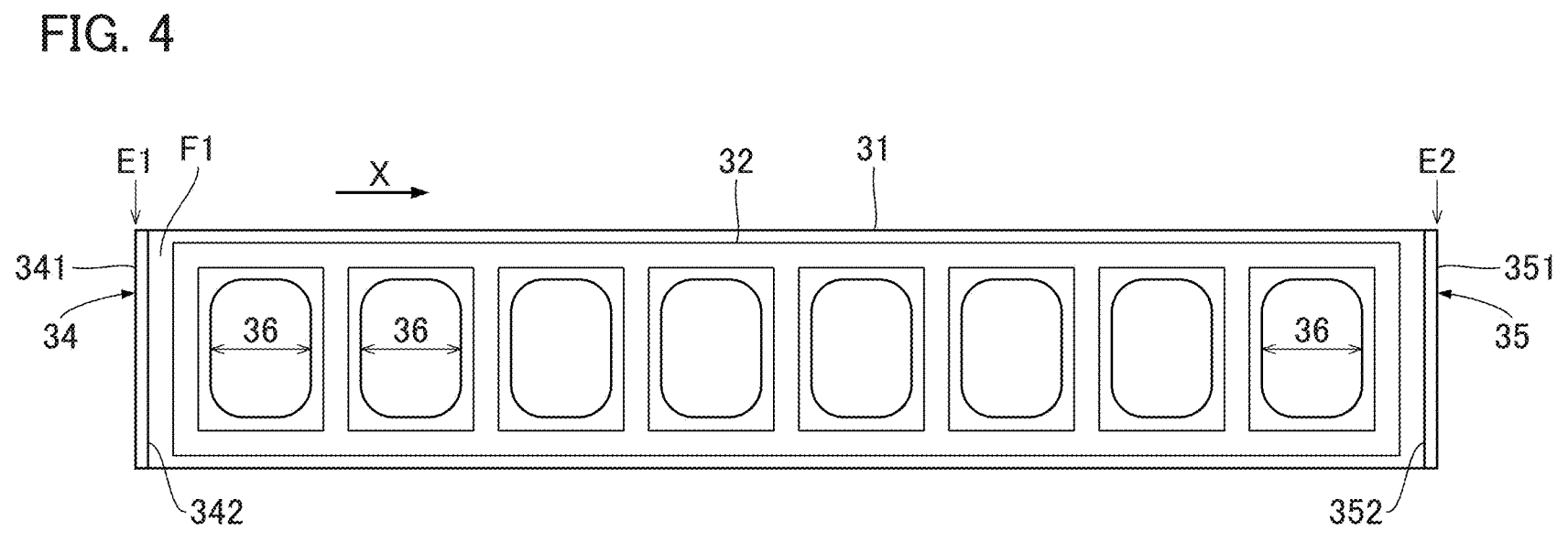

FIG. 3 and FIG. 4 are plan views of the seal member 30. In FIGS. 3 and 4, the seal member 30 is illustrated in a state (hereinafter, an "initial state") before the valve device 100 is installed. FIG. 3 shows a plan view and a cross-sectional view of an inner peripheral surface of the seal member 30 that faces the outer peripheral surface 11 of the shaft member 10. The cross-sectional view of FIG. 3 is a cross-sectional view, taken along III-III line in the plan view of FIG. 3. FIG. 4 is a plan view of an outer peripheral surface of the seal member 30 that faces the inner peripheral surface 21 of the housing member 20. The X-axis illustrated in FIGS. 3 and 4 is an axis orthogonal to the rotation axis C.

As illustrated in FIGS. 3 and 4, the seal member 30 in the initial state is a flat plate member having a rectangular strip shape elongated along the X-axis. The seal member 30 of the present embodiment is formed in a flat-plate shape including a first end face E1 and a second end face E2.

The first end face E1 and the second end face E2 are end faces which are located on the opposite sides from each other in the X-axis direction. Therefore, the first end face E1 and the second end face E2 each are an elongated plane extending along the rotation axis C. As illustrated in FIG. 2, the seal member 30 is disposed in a gap between the shaft member 10 and the housing member 20 while being curved in an arc shape such that the first end face E1 and the second end face E2 are close to each other. Accordingly, the direction of the X-axis corresponds to the circumferential direction around the rotation axis C.

The seal member 30 of the present embodiment comprises a structure in which a base portion 31, a first bead 32, a second bead 33, a first protrusion portion 34, and a second protrusion portion 35 are integrally formed. The seal member 30 is integrally formed using a variety of types of resin materials. For example, the seal member 30 is formed from a rubber material such as chloroprene rubber (CR), silicone rubber (SR), acrylic rubber (ACM), urethane rubber (U), polyurethane rubber (PUR), vinyl methyl silicone rubber (VMQ), ethylene propylene diene rubber (EPDM), or fluororubber (FKM). It is to be noted that one or both of the first bead 32 and the second bead 33 may be omitted.

The base portion 31 is a flat plate-shaped portion elongated along the X-axis. The base portion 31 includes a first surface F1 and a second surface F2. The first surface F1 and the second surface F2 are mutually opposed surfaces. In a state in which the seal member 30 is installed in a gap between the shaft member 10 and the housing member 20 (hereinafter, an "installation state"), the first surface F1 faces the inner peripheral surface 21 of the housing member 20, and the second surface F2 faces the outer peripheral surface 11 of the shaft member 10. That is, when the seal member 30 is curved in an arc shape, the first surface F1 corresponds to the outer peripheral surface of the seal member 30, and the second surface F2 corresponds to the inner peripheral surface of the seal member 30. It is to be noted that the shape of the base portion 31 may be freely selected, and is not limited to the shapes illustrated in FIGS. 3 and 4. For example, the base portion 31 may not have an elongated shape.

As illustrated in FIGS. 3 and 4, a plurality of openings 36 is formed in the base portion 31. Each of the plurality of openings 36 is a through-hole extending between the first surface F1 and the second surface F2. The openings 36 are spaced apart from each other along the X-axis. Each of the plurality of openings 36 corresponds to a different opening 22 of the housing member 20. Specifically, in the radial direction, each of the openings 22 of the housing member 20 overlaps an opening 36 that corresponds to the opening 22 among the plurality of openings 36 of the base portion 31. It is to be noted that the shape of each opening 36 may be freely selected, and it is not limited to the examples of FIGS. 3 and 4. For example, a circular or oval shaped opening 36 may be formed in the base portion 31.

As illustrated in FIG. 4, the first bead 32 is a linear protrusion formed on the first surface F1 of the base portion 31 and protruding from the first surface F1. Specifically, the first bead 32 is formed in a lattice shape surrounding each of the plurality of openings 36 in plan view. The top of the first bead 32 is in contact with the inner peripheral surface 21 of the housing member 20. On the other hand, as illustrated in FIG. 3, the second bead 33 is a linear protrusion formed on the second surface F2 of the base portion 31 and protrudes from the second surface F2. Specifically, the second bead 33 is formed in a lattice shape surrounding each of the openings 36 in plan view. The top portion of the second bead 33 is in contact with the outer peripheral surface 11 of the shaft member 10. It is to be noted that the shapes of the first bead 32 and the second bead 33 are not limited to the above examples.

A first protrusion portion 34 is a linear protrusion protruding from the first surface F1 along the first end face E1. Specifically, the first protrusion portion 34 protrudes perpendicularly from the first surface F1. The first protrusion portion 34 includes an outer wall face 341 and an inner wall face 342. The outer wall face 341 is a side wall face of the first protrusion portion 34 that faces outward. The first end face E1 is constituted by the outer wall face 341 and the side face of the base portion 31. The inner wall face 342 is a side wall face opposite to the outer wall face 341. The angle of the first protrusion portion 34 relative to the first surface F1 is not limited to a right angle, and it may be freely selected.

The second protrusion portion 35 is a linear protrusion protruding from the first surface F1 along the second end face E2. Specifically, the second protrusion portion 35 protrudes perpendicularly from the first surface F1. The second protrusion portion 35 includes an outer wall face 351 and an inner wall face 352. The outer wall face 351 is a side wall face of the second protrusion portion 35 that faces the outside. The second end face E2 is constituted by the outer wall face 351 and the side face of the base portion 31. The inner wall face 352 is a side wall face opposite to the outer wall face 351. The angle of the second protrusion portion 35 relative to the first surface F1 is not limited to a right angle, and it may be freely selected.

Figure 5:
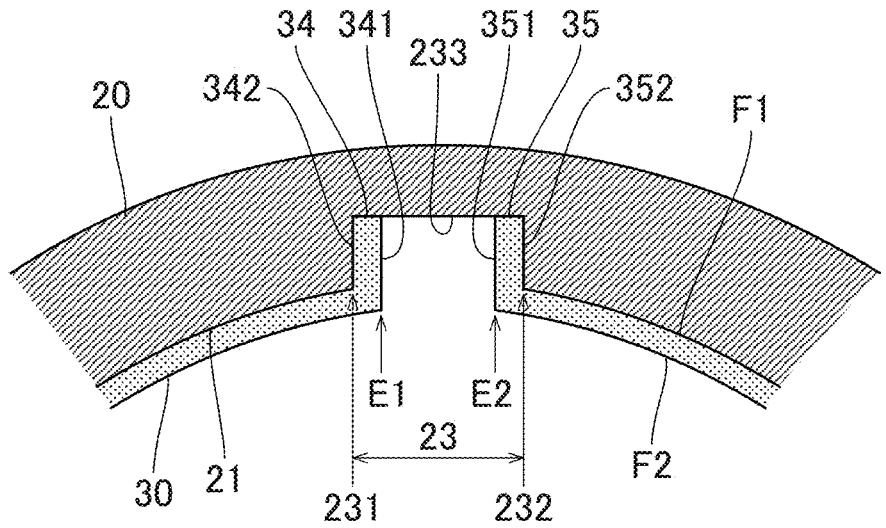
FIG. 5 is an enlarged sectional view of a part of the valve device.

FIG. 5 is an enlarged cross-sectional view of a portion of the valve device 100. Specifically, a part of the housing member 20 in the circumferential direction is enlarged and illustrated in FIG. 5. As illustrated in FIGS. 1 and 5, a groove portion 23 is formed on the inner peripheral surface 21 of the housing member 20. The groove portion 23 is a recessed portion having a predetermined width along the direction of the rotation axis C.

Specifically, as illustrated in FIG. 5, the groove portion 23 of the present embodiment includes a first wall face 231, a second wall face 232, and a bottom face 233. The bottom face 233 of the groove portion 23 is a flat surface or a curved surface located radially outward of the inner peripheral surface 21 of the housing member 20. The first wall face 231 and the second wall face 232 are sidewall faces protruding radially inward from the bottom face 233. That is, the first wall face 231 and the second wall face 232 connect the bottom face 233 of the groove portion 23 and the inner peripheral surface 21 of the housing member 20. Accordingly, the first wall face 231 and the second wall face 232 face each other with a space therebetween in the circumferential direction. The distance between the first wall face 231 and the second wall face 232 corresponds to the lateral width of the groove portion 23.

As illustrated in FIG. 5, in the installed state, the first protrusion portion 34 and the second protrusion portion 35 of the seal member 30 are located inside the groove portion 23. Specifically, the inner wall face 342 of the first protrusion portion 34 is in contact with the first wall face 231 of the groove portion 23, and the inner wall face 352 of the second protrusion portion 35 is in contact with the second wall face 232 of the groove portion 23. Therefore, in the installed state, the outer wall face 341 of the first protrusion portion 34 and the outer wall face 351 of the second protrusion portion 35 face each other with a space therebetween. Also, in the installed state, the top of the first protrusion portion 34 and the top of the second protrusion portion 35 are in contact with the bottom face 233 of the groove portion 23. However, the top portion of the first protrusion portion 34 and the top portion of the second protrusion portion 35 may face the bottom face 233 with a space therebetween.

As described above, in the present embodiment, the first protrusion portion 34 and the second protrusion portion 35 are located inside the groove portion 23 formed in the inner peripheral surface 21 of the housing member 20. Therefore, the circumferential movement of the seal member 30 (rotation about the rotation axis C) is restricted. That is, the positioning of the seal member 30 in the circumferential direction is realized by the configuration in which the first protrusion portion 34 and the second protrusion portion 35 are located inside the groove portion 23. In this embodiment, in particular, the first protrusion portion 34 of the seal member 30 is in contact with the first wall face 231 of the groove portion 23, and the second protrusion portion 35 is in contact with the second wall face 232 of the groove portion 23. Therefore, compared with a configuration in which the first protrusion portion 34 and the first wall face 231 face each other with a space therebetween, or a configuration in which the second protrusion portion 35 and the second wall face 232 face each other with a space therebetween, the circumferential position (rotation angle) of the seal member 30 is easily restricted.

Figure 6:
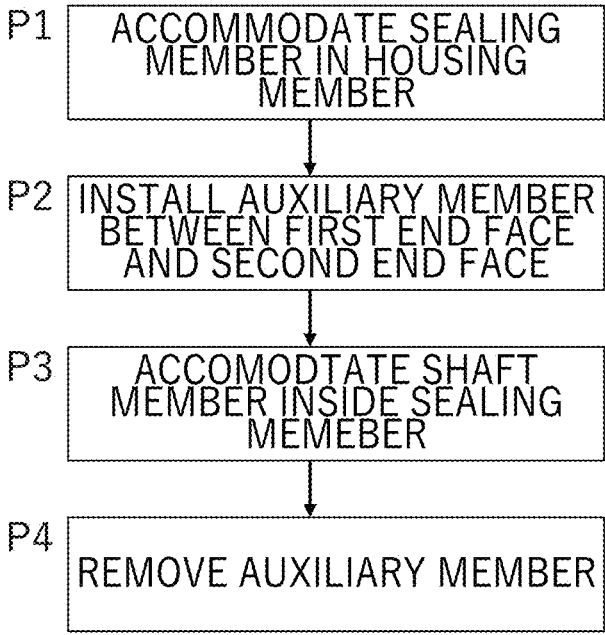
FIG. 6 is an explanatory view of a procedure for manufacturing the valve device.

FIG. 6 is an explanatory diagram of a procedure for manufacturing the valve device 100 exemplified above. The series of steps in FIG. 6 is an example of a "method of manufacturing a sealing structure". The series of steps in FIG. 6 is started after the seal member 30 in the initial state, the shaft member 10, and the housing member 20 have been prepared.

Figure 7:
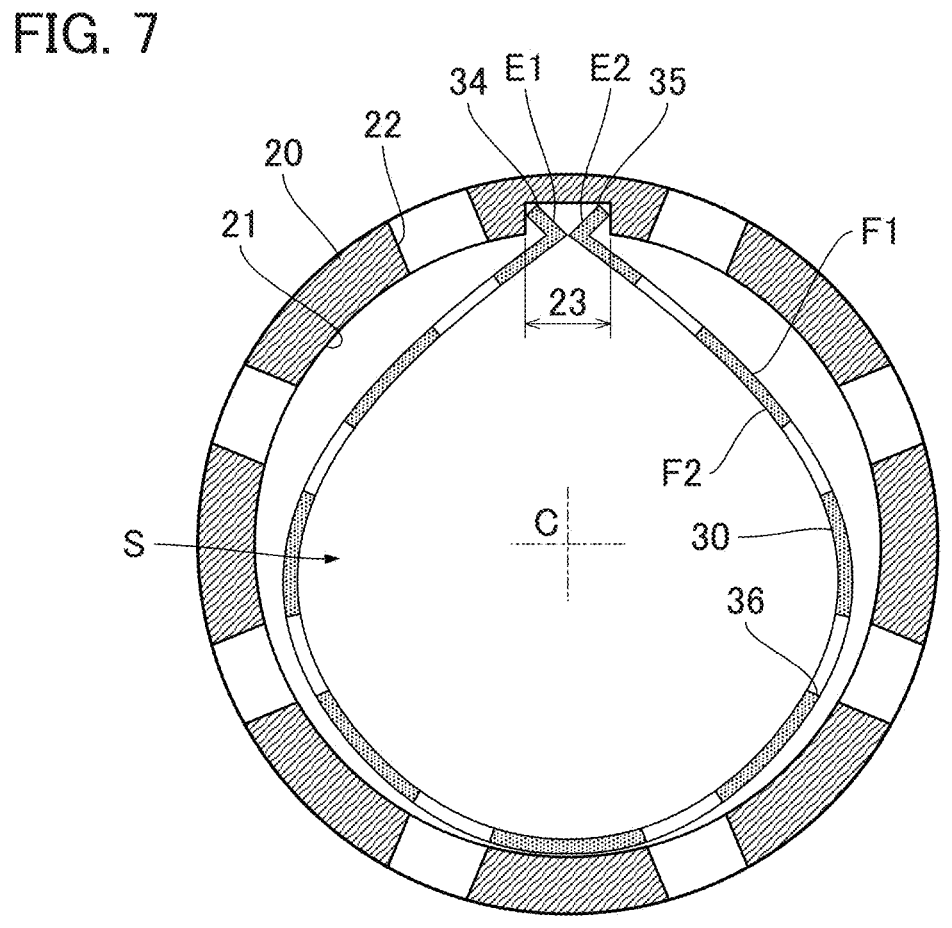

In the first step P1, the seal member 30 is accommodated in an inner space S of the housing member 20. Specifically, as illustrated in FIG. 7, the seal member 30 is curved by an external force so that the first end face E1 and the second end face E2 approach each other, and the seal member 30 is accommodated in the inner space S while the curvature of the seal member 30 is maintained. The seal member 30 in the initial state is curved in an arc shape such that the first surface F1 is located outward and the second surface F2 is located inward. When accommodated in the inner space S, the first end face E1 and the second end face E2 are in contact with each other. As illustrated in FIG. 7, the seal member 30 is accommodated in the inner space S in a state in which the first protrusion portion 34 and the second protrusion portion 35 are located inside the groove portion 23 of the housing member 20. After the seal member 30 is accommodated in the inner space S, the external force that has curved the seal member 30 is released. It is to be noted that the first end face E1 and the second end face E2 may not be in contact with each other in step P1.

Immediately after step P1, the vicinity of the center of the seal member 30 in the X-axis is curved in an arc shape along the inner peripheral surface 21 of the housing member 20. However, as illustrated in FIG. 7, a portion of the seal member 30 in the vicinity of the first end face E1 and a portion in the vicinity of the second end face E2 are maintained in the shape of a straight line (or a curve having a small curvature), and are spaced apart from the inner peripheral surface 21 of the housing member 20. That is, the seal member 30 is accommodated in the inner space S, while being deformed into a teardrop shape in plan view. Therefore, a portion of the seal member 30 in the vicinity of the first end face E1 and a portion in the vicinity of the second end face E2 intersect each other at an angle in plan view.

Figure 8:
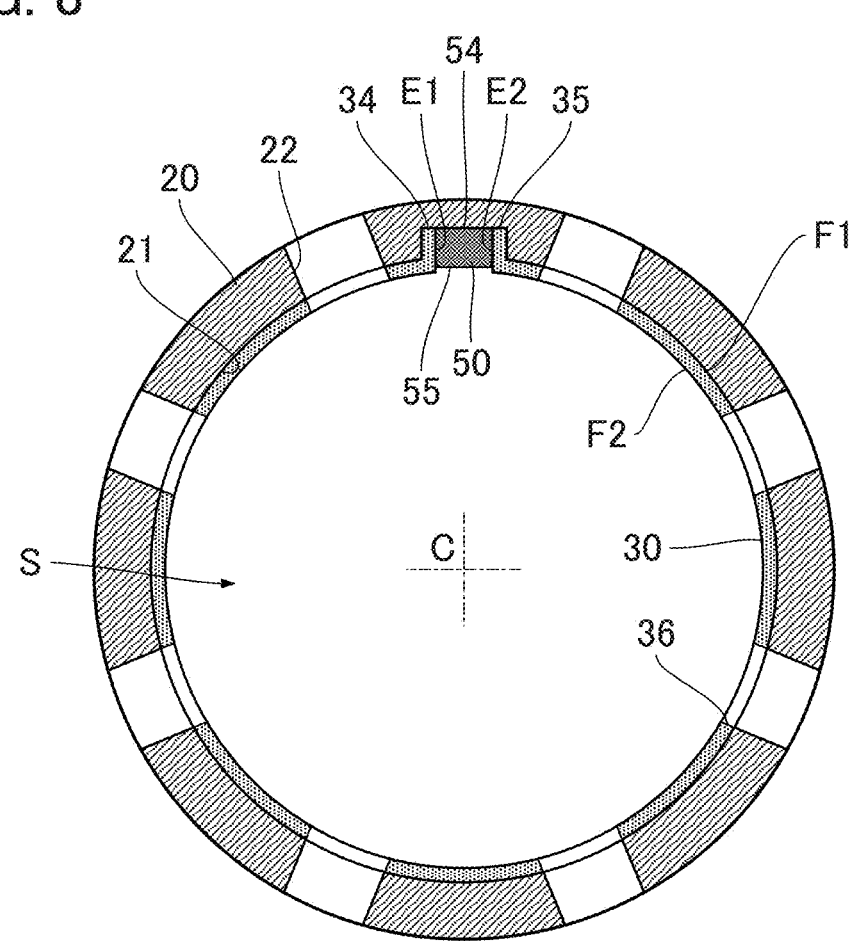
FIG. 8 is an explanatory view of a step of installing an auxiliary member.

In step P2 after performing step P1, as illustrated in FIG. 8, an auxiliary member 50 is installed between the first end face E1 and the second end face E2. The auxiliary member 50 is in contact with the first end face E1 and the second end face E2. The auxiliary member 50 is a jig for correcting the teardrop-shaped seal member 30 to an arc shape that extends along the inner peripheral surface 21 of the housing member 20.

Figure 9:
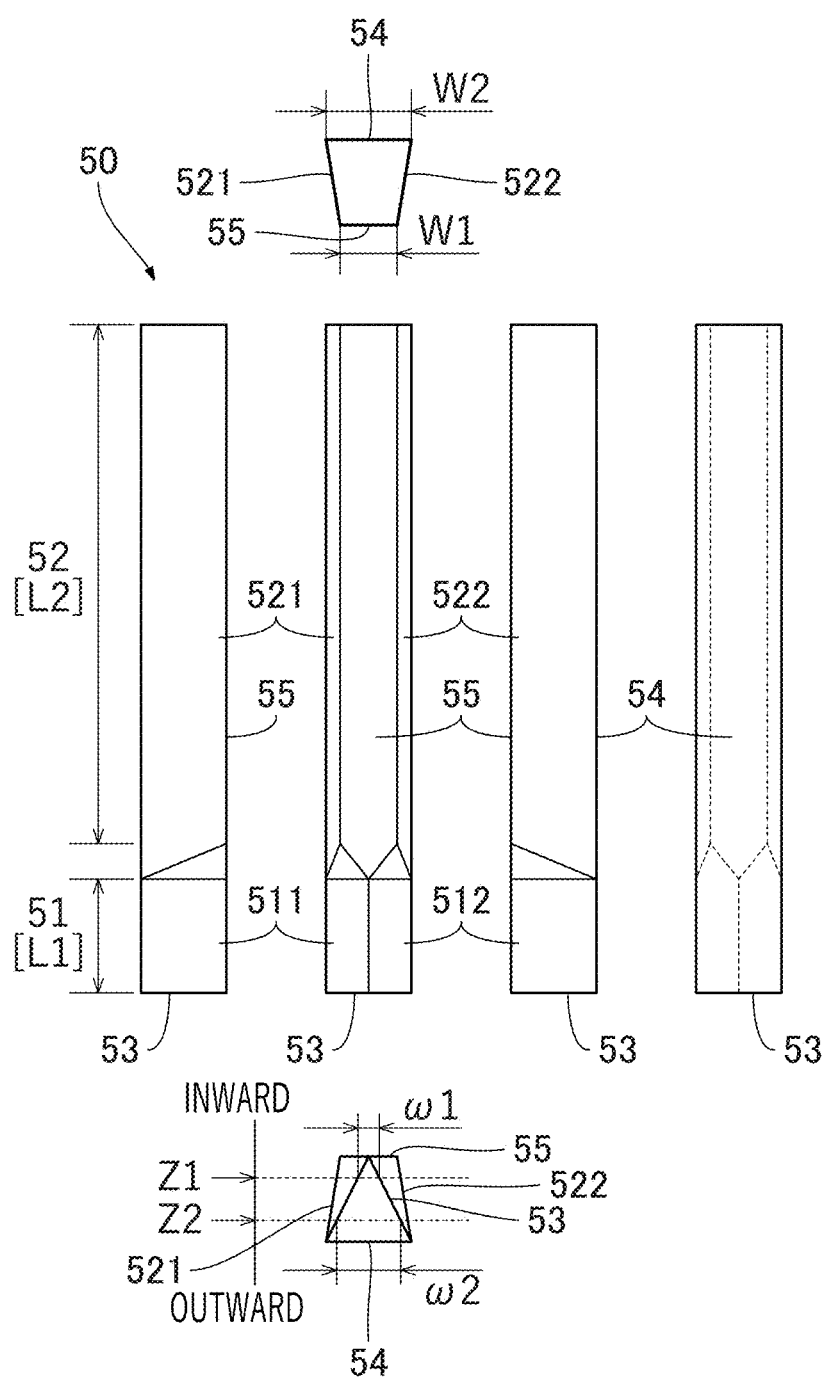
FIG. 9 shows six orthogonal views of the auxiliary member.
Figure 10:
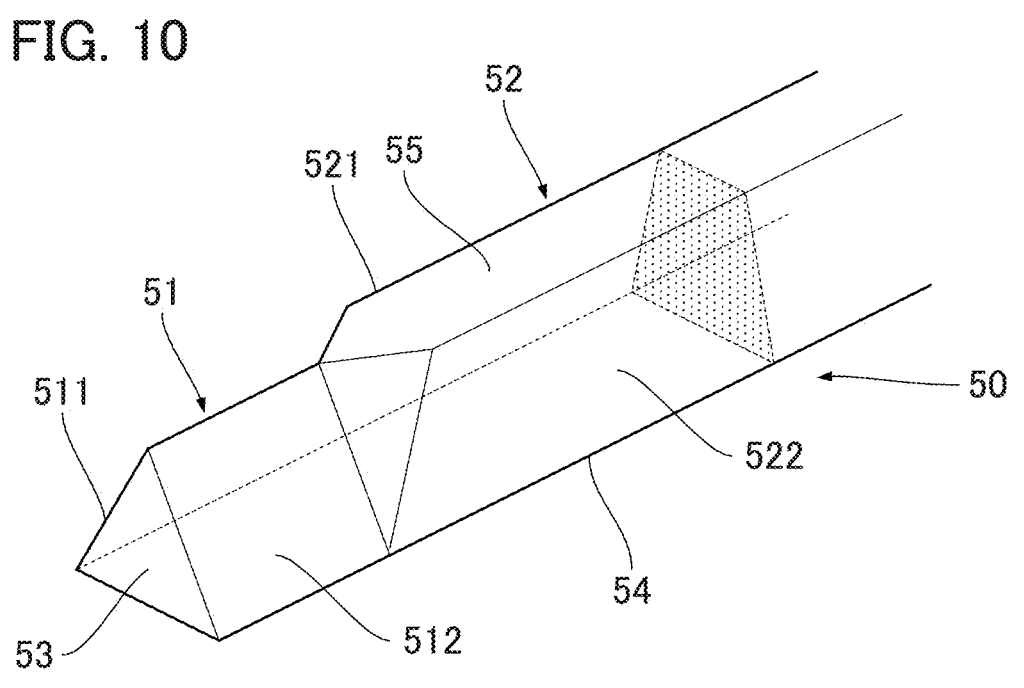

FIG. 9 shows six orthogonal views of the auxiliary member 50, and FIG. 10 is a perspective view of the auxiliary member 50. The auxiliary member 50 has an elongated structure including a first portion 51 and a second portion 52. The first portion 51 is a portion of the auxiliary member 50 that includes one of the end faces (hereinafter, a "leading end face 53"), and the second portion 52 is a portion of the auxiliary member 50 that includes the other end face. The length L1 of the first portion 51 is L1<L2, where L2 is the length of the second portion 52.

The first portion 51 includes a first inclined face 511, a second inclined face 512, and an outer wall face 54. The outer wall face 54 corresponds to the bottom face of the auxiliary member 50. As illustrated in FIG. 8, the outer wall face 54 is located radially outward, with the auxiliary member 50 disposed between the first end face E1 and the second end face E2. The first inclined face 511 and the second inclined face 512 are flat surfaces inclined relative to the outer wall face 54. As will be understood from the above description, the cross-sectional shape of the first portion 51 is a triangle (in particular, an isosceles triangle). However, the cross-sectional shape of the first portion 51 is not limited to a triangle and may be freely changed.

FIG. 9 shows a first position (first radial position) Z1 and a second position (second radial position) Z2 in the radial direction. The second position Z2 is radially outward of the first position Z1. As illustrated in FIG. 9, the planar shape of the leading end face 53 of the auxiliary member 50 is a shape in which the lateral width ω1 in the first position Z1 is smaller than the lateral width ω2 in the second position Z2 (ω1<ω2).

The second portion 52 includes a first side face 521, a second side face 522, an outer wall face 54, and an inner wall face 55. The outer wall face 54 is continuous across the first portion 51 and the second portion 52. The inner wall face 55 is a surface opposite to the outer wall face 54 and corresponds to the top surface of the auxiliary member 50. As illustrated in FIG. 8, the inner wall face 55 is positioned radially inward, with the auxiliary member 50 disposed between the first end face E1 and the second end face E2. As illustrated in FIG. 9, the lateral width W1 of the inner wall face 55 is smaller than the lateral width W2 of the outer wall face 54 (W1<W2).

The first side face 521 and the second side face 522 are flat surfaces inclined relative to the outer wall face 54. As will be understood from the above description, the cross-sectional shape of the second portion 52 is trapezoidal (in particular, isosceles trapezoidal). As illustrated in FIGS. 9 and 10, the first portion 51 is thinner (smaller in cross-section) than the second portion 52.

Figure 11:
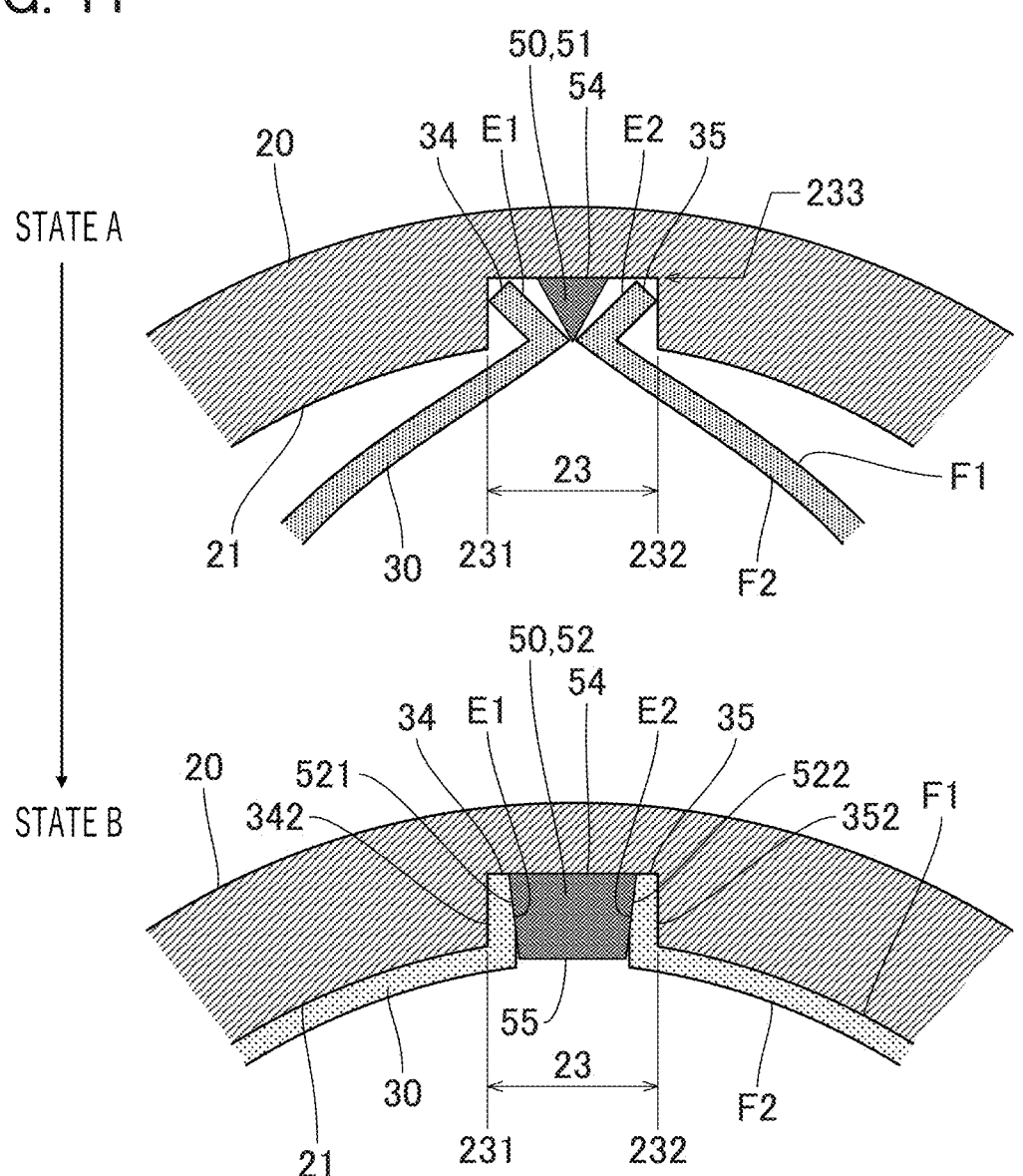
FIG. 11 is an explanatory view of the step of installing the auxiliary member.

FIG. 11 is an explanatory diagram of step P2 of installing the auxiliary member 50. In the present embodiment, the auxiliary member 50 is moved along the rotation axis C with the first portion 51 leading and is thereby inserted between the first end face E1 and the second end face E2.

In an early stage of the insertion of the auxiliary member 50, the first portion 51 of the auxiliary member 50 is inserted between the first end face E1 and the second end face E2, as illustrated as State A in FIG. 11. As described above, the first portion 51 is thinner than the second portion 52. Therefore, for example, as compared with a configuration in which the first portion 51 is thicker (larger than in cross-section) than the second portion 52, the auxiliary member 50 is easily inserted between the first end face E1 and the second end face E2. In the present embodiment, in particular, the lateral width ω1 of a radially inner portion of the leading end face 53 of the auxiliary member 50 is less than the lateral width ω2 of a radially outer portion of the leading end face 53 of the auxiliary member 50. Therefore, the inner portion of the leading end face 53 of the auxiliary member 50 can be easily inserted between the first end face E1 and the second end face E2.

When the first portion 51 is inserted between the first end face E1 and the second end face E2, the auxiliary member 50 is moved along the rotation axis C (for example, downward in the vertical direction). In the course of the movement of the auxiliary member 50, the outer wall face 54 of the auxiliary member 50 is continuously in contact with the bottom face 233 of the groove portion 23 of the housing member 20. That is, the bottom face 233 of the groove portion 23 also functions as a guide for restricting the radial position of the auxiliary member 50.

As the auxiliary member 50 advances along the rotation axis C, the second portion 52 of the auxiliary member 50 comes into contact with the first end face E1 and the second end face E2, i.e., it reaches State B illustrated in FIG. 11. That is, the first side face 521 of the second portion 52 comes into contact with the first end face E1, and the second side face 522 comes into contact with the second end face E2. In State B, the first end face E1 is pressed circumferentially by the first side face 521, and the second end face E2 is pressed circumferentially by the second side face 522. Therefore, the distance between the first end face E1 and the second end face E2 increases compared with that before the auxiliary member 50 is inserted.

As illustrated in FIG. 11, as the first end face E1 is circumferentially pressed by the auxiliary member 50, a portion of the seal member 30 in the vicinity of the first end face E1 is deformed such that it conforms to the inner peripheral surface 21 of the housing member 20. Similarly, the second end face E2 is circumferentially pressed by the auxiliary member 50, and consequently, a portion of the seal member 30 in the vicinity of the second end face E2 is deformed such that it conforms to the inner peripheral surface 21 of the housing member 20. That is, being pressed by the auxiliary member 50, the seal member 30, which was teardrop-shaped in plan view immediately after step P1, is corrected to an arc shape extending along the inner peripheral surface 21 of the housing member 20.

As described above, the distance between the first end face E1 and the second end face E2 increases by the installation of the auxiliary member 50. That is, the circumferential length of the seal member 30 is virtually extended by the insertion of the auxiliary member 50. Accordingly, the portion of the seal member 30 in the vicinity of each of the first end face E1 and the second end face E2 is easily deformed into a shape that conforms to the inner peripheral surface 21 of the housing member 20. The auxiliary member 50 is also referred to as a spacer for securing a distance between the first end face E1 and the second end face E2.

Moreover, as the first end face E1 is pressed circumferentially by the auxiliary member 50, the first protrusion portion 34 inclined relative to the radial direction as in State A of FIG. 11 is adjusted to extend along the radial direction as in State B. Similarly, the second end face E2 is pressed circumferentially by the auxiliary member 50, such that the second protrusion portion 35 inclined relative to the radial direction is adjusted to extend along the radial direction.

With the above-described action, as illustrated in FIG. 8, when the auxiliary member 50 is installed between the first end face E1 and the second end face E2, the first protrusion portion 34 and the second protrusion portion 35 are located inside the groove portion 23. Specifically, as illustrated as State B in FIG. 11, the inner wall face 342 of the first protrusion portion 34 is in contact with the first wall face 231 of the groove portion 23, and the inner wall face 352 of the second protrusion portion 35 is in contact with the second wall face 232 of the groove portion 23. That is, the first protrusion portion 34 is held between the first side face 521 of the auxiliary member 50 and the first wall face 231 of the groove portion 23, and the second protrusion portion 35 is held between the second side face 522 of the auxiliary member 50 and the second wall face 232 of the groove portion 23. It is to be noted that, in State B, the inner wall face 342 of the first protrusion portion 34 may not be in contact with the first wall face 231 of the groove portion 23. Similarly, the inner wall face 352 of the second protrusion portion 35 may not be in contact with the second wall face 232 of the groove portion 23.

The auxiliary member 50 is moved along the rotation axis C until the leading end face 53 comes into contact with a bottom face of the inner space S of the housing member 20.

The total length of the auxiliary member 50 exceeds the depth of the inner space S. Accordingly, with the leading end face 53 being in contact with the bottom face of the inner space S, a portion of the auxiliary member 50 on the rear end of the second portion 52 protrudes upward from the top surface of the housing member 20. It is to be noted that the auxiliary member 50 does not necessarily have to be advanced until the leading end face 53 comes into contact with the bottom face of the inner space S.

By step P2 described above, the seal member 30 is corrected into an arc shape, so that a cylindrical space is formed inside the seal member 30 as illustrated in FIG. 8. In step P3 after step P2, the shaft member 10 is accommodated inside the seal member 30. That is, the shaft member 10 is accommodated in the inner space S of the housing member 20 in a state surrounded by the arc-shaped seal member 30.

As illustrated as State B in FIG. 11, in a state in which the auxiliary member 50 is installed between the first end face E1 and the second end face E2, the inner wall face 55 of the auxiliary member 50 is located radially outward of the second surface F2 (inner peripheral surface) of the seal member 30. In other words, the inner wall face 55 of the auxiliary member 50 is at a position recessed relative to the second surface F2 of the seal member 30. Therefore, in step P3 in which the shaft member 10 is accommodated inside the seal member 30, the likelihood of the shaft member 10 colliding with the auxiliary member 50 is reduced. That is, the shaft member 10 can be easily accommodated into the inner space S without being interfered with by the auxiliary member 50.

In step P4 after step P3, the auxiliary member 50 is removed. That is, the auxiliary member 50 is removed after the shaft member 10 is accommodated in the inner space S. As described above, the rear end portion of the auxiliary member 50 protrudes from the top surface of the housing member 20. In step P4, the auxiliary member 50 is removed by gripping and lifting the rear end of the auxiliary member 50.

When the auxiliary member 50 is removed in step P4, as described above, a space is created between the first end face E1 and the second end face E2. The space between the first end face E1 and the second end face E2 can absorb dimensional errors of the housing member 20 and the shaft member 10. Furthermore, by being removed, the auxiliary member 50 can be used to manufacture more than one valve device 100. Therefore, the manufacturing cost of a valve device 100 can be reduced, as compared with a configuration in which the auxiliary member 50 remains installed between the first end face E1 and the second end face E2, i.e., the auxiliary member 50 needs to be separately prepared for each valve device 100.

As described above, in the present embodiment, the flat seal member 30 is accommodated in the inner space S of the housing member 20 in a curved state. Therefore, the transportation cost of the seal member 30 can be reduced, for example, as compared with a configuration requiring a seal member 30 to be formed in a cylindrical shape. Furthermore, as the first end face E1 and the second end face E2 are circumferentially pressed by the auxiliary member 50, the portions of the seal member 30 in the vicinity of the first end face E1 and the second end face E2 are deformed into shapes to extend along the inner peripheral surface 21 of the housing member 20, as described above.

B: Modifications

Examples of modifications that can be made to the embodiment described above will now be described. Two or more aspects freely selected from the following examples may be appropriately combined as long as they do not conflict with each other.

Figure 12:
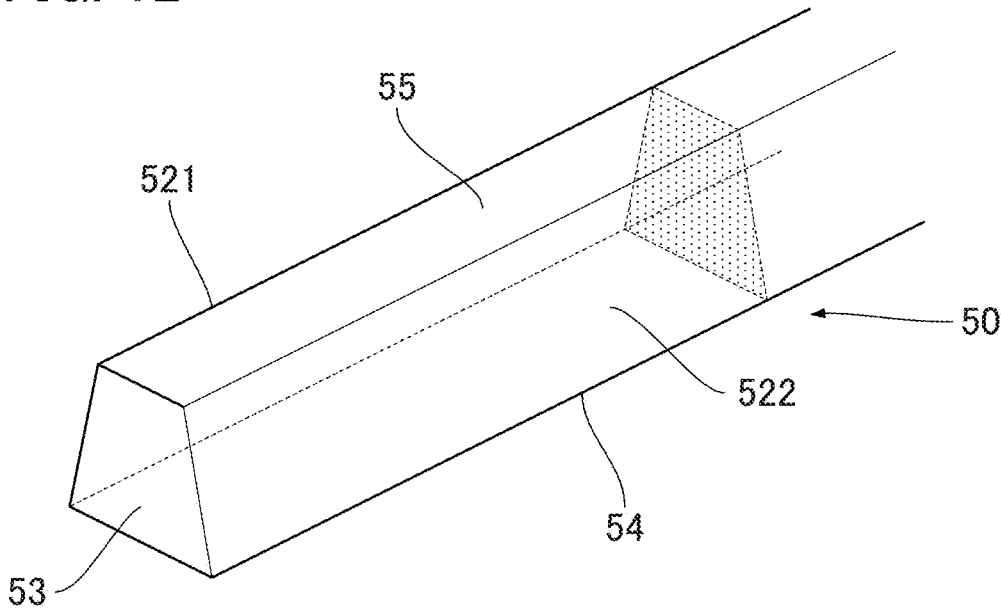
FIG. 12 is a perspective view of an auxiliary member according to a modification.

(1) The shape of the auxiliary member 50 is not limited to the above-described example. For example, in the above-described embodiment, the auxiliary member 50 includes the first portion 51 and the second portion 52 having different cross-sectional shapes. However, the cross-sectional shape of the auxiliary member 50 may be the same over the entire length. For example, as illustrated in FIG. 12, a configuration in which the cross-sectional shape of the auxiliary member 50 is trapezoidal over the entire length is also conceivable. According to the configuration in which the cross-sectional shape of the auxiliary member 50 is the same over the entire length, the first end face E1 and the second end face E2 are advantageously pressed uniformly throughout the entire length by the auxiliary member 50 in step P2.

Figure 13:
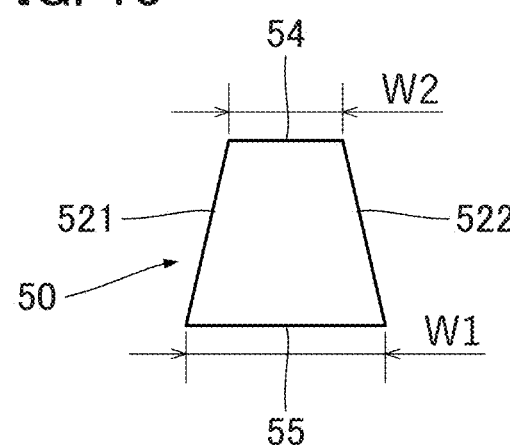
FIG. 13 is a cross-sectional view of an auxiliary member according to a modification.
Figure 14:
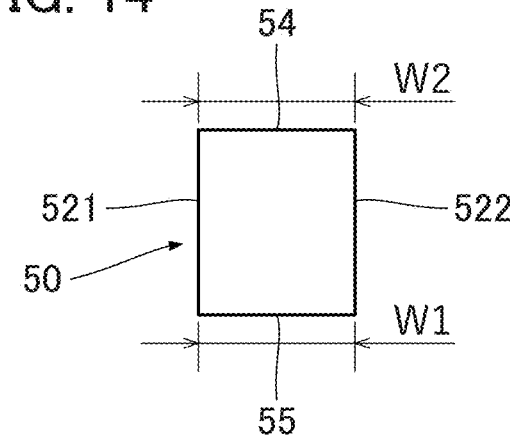
FIG. 14 is a cross-sectional view of an auxiliary member according to a modification.

In the above-described embodiment, the lateral width W1 of the inner wall face 55 of the second portion 52 of the auxiliary member 50 is smaller than the lateral width W2 of the outer wall face 54. However, the dimensional relationship between the respective parts in the auxiliary member 50 is not limited to the above-described example. For example, as illustrated in FIG. 13, a configuration in which the lateral width W1 of the inner wall face 55 is larger than the lateral width W2 of the outer wall face 54 or, as illustrated in FIG. 14, a configuration in which the lateral width W1 of the inner wall face 55 and the lateral width W2 of the outer wall face 54 are equal is also conceivable.

(2) In the above-described embodiment, beads (the first bead 32 and the second bead 33) are formed on both surfaces of the seal member 30. However, a configuration in which only one of the first bead 32 and the second bead 33 is formed, or a configuration in which the first bead 32 and the second bead 33 are omitted is also conceivable.

Figure 15:
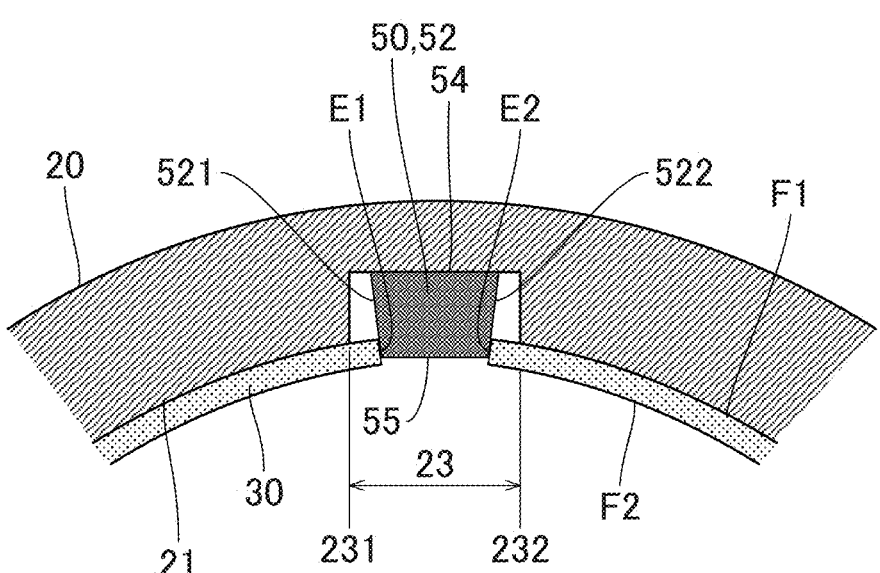
FIG. 15 is an enlarged sectional view of a portion of the valve device according to a modification.

(3) In the above-described embodiment, the first protrusion portion 34 and the second protrusion portion 35 are formed on the seal member 30. However, the first protrusion portion 34 and the second protrusion portion 35 may be omitted. In a configuration in which the first protrusion portion 34 and the second protrusion portion 35 are omitted, as illustrated in FIG. 15, one of the side faces of the base portion 31 serves as the first end face E1 and is pressed circumferentially by the first side face 521 of the auxiliary member 50, and the other side face of the base portion 31 serves as the second end face E2 and is pressed circumferentially by the second side face 522 of the auxiliary member 50. As described above, as the first end face E1 and the second end face E2 are pressed by the auxiliary member 50, the seal member 30 having a teardrop shape is corrected in an arc shape along the inner peripheral surface 21 of the housing member 20 as in the first embodiment.

(4) In the above-described embodiment, the auxiliary member 50 is removed in step P4, but removal of the auxiliary member 50 may be omitted. That is, the valve device 100 may operate with the auxiliary member 50 installed between the first end face E1 and the second end face E2.

In the above-described embodiment, the auxiliary member 50 is removed by gripping a portion of the auxiliary member 50 on the rear end. However, in the configuration in which the auxiliary member 50 is not removed, it is not necessary that the rear end portion of the auxiliary member 50 protrude upward from the top surface of the housing member 20. Accordingly, a configuration in which the total length of the auxiliary member 50 is less than the depth of the inner space S may be suitable.

Figure 16:
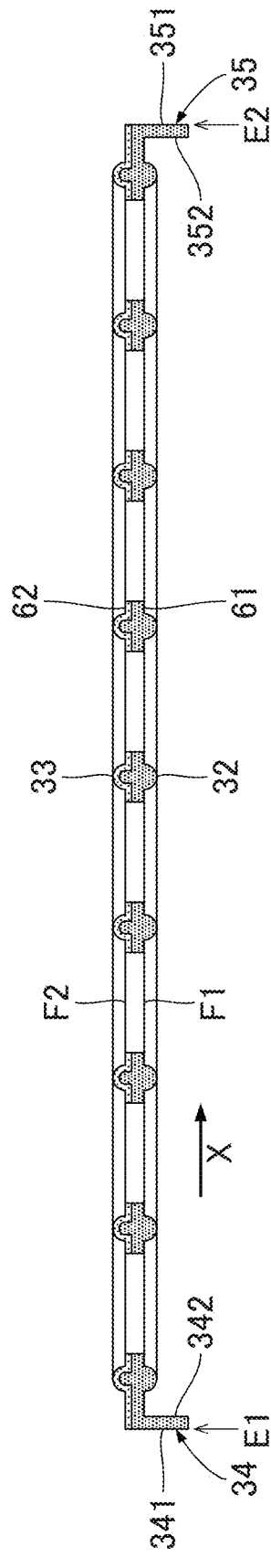
FIG. 16 is a cross-sectional view of a seal member according to a modification.

(5) In the above-described embodiment, the seal member 30 is formed of a single material, but the seal member 30 may be formed by laminating a plurality of layers formed of different materials. For example, as illustrated in FIG. 16, the seal member 30 may be formed by laminating a first layer 61 and a second layer 62. The first layer 61 constitutes a portion of the base portion 31 on the side of the first surface F1, the first bead 32, the first protrusion portion 34, and the second protrusion portion 35. The second layer 62 constitutes a portion of the base portion 31 on the side of the second surface F2.

Since the shaft member 10 rotates while contacting the second surface F2 (the second bead 33), the second surface F2 is required to be low friction. Thus, the second layer 62 is formed of a low-friction material such as polytetrafluoroethylene (PTFE). The first layer 61 is formed of any of various rubber materials exemplified in the above-described embodiment. The second layer 62 is thinner than the first layer 61.

Figure 17:
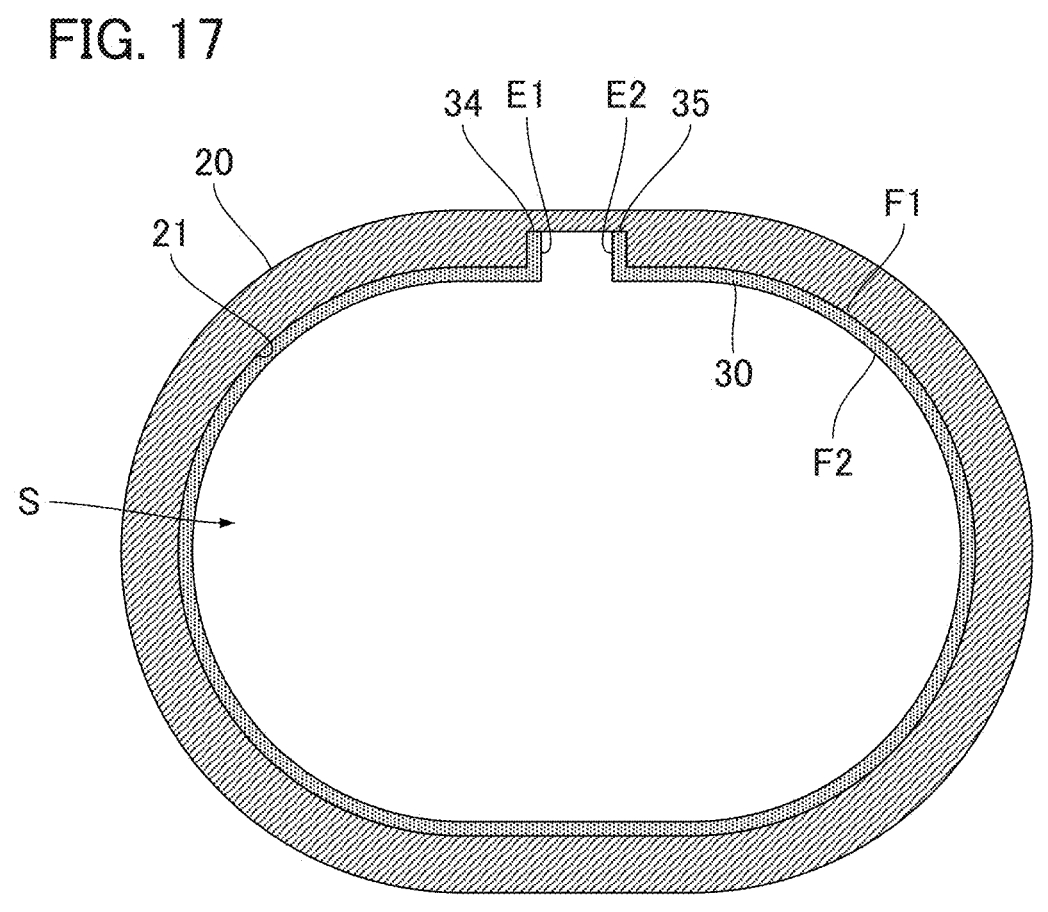

(6) In the above embodiment, the seal member 30 in the installed state has an arc shape. However, the shape of the seal member 30 in the installed state is not limited to the above example. For example, as illustrated in FIG. 17, in a configuration in which the cross-sectional shape of the inner space S in the housing member 20 is an oval shape, the seal member 30 is installed in the housing member 20 in a state in which the cross-sectional shape is corrected into an oval shape by the auxiliary member 50. The configuration of FIG. 17 is used, for example, as a multi-control valve. As will be understood from the above example, the seal member 30 in the installed state does not need to be entirely curved, and may include a planar portion.

(7) In the above-described embodiment, the groove portion 23 is formed on the inner peripheral surface 21 of the housing member 20, but the groove portion 23 may be omitted.

(8) In the above embodiment, the auxiliary member 50 is inserted between the first end face E1 and the second end face E2 by moving the auxiliary member 50 along the rotation axis C. However, the auxiliary member 50 may be installed between the first end face E1 and the second end face E2 in manner differing from the above example. For example, the auxiliary member 50 disposed in the inner space S along the rotation axis C may be moved radially outward to be inserted between the first end face E1 and the second end face E2. In the configuration in which the auxiliary member 50 is moved in the radial direction, the first portion 51, which comprises a thin end (a leading end with a small cross-section), is not essential. Thus, for example, as illustrated in FIG. 12, the auxiliary member 50 having a rectangular cross-sectional shape over the entire length is used.

(9) The notation "n" (n is a natural number) in the present application is used only as a formal and convenient label for distinguishing each element by notation, and has no substantive meaning. Therefore, it does not restrict the interpretation of the position of each element, the order of manufacture, or the like on the basis of the notation "n".

C: Appendices

The following aspects are derivable from the embodiments described above.

A method of manufacturing a sealing structure according to an aspect (aspect 1) of the present disclosure includes:

accommodating in an inner space of a housing member a flat plate-shaped seal member including a first end face and a second end face located on opposite sides to each other, while the seal member being in a curved state such that the first end face and the second end face are close to each other; installing an auxiliary member to be in contact with the first end face and the second end face between the first end face and the second end face; and accommodating a shaft member inside the seal member.

In the above aspect, a flat seal member is accommodated in a curved state in the inner space of the housing member. Therefore, for example, the transportation cost of the sealing member can be reduced, as compared with a configuration in which the sealing member formed into a cylindrical shape is required.

In an example (aspect 2) of aspect 1, in the installing of the auxiliary member, by installing the auxiliary member, a distance between the first end face and the second end face is increased relative to the distance prior to installation of the auxiliary member. In the above-described aspect, the distance between the first end face and the second end face is increased due to the installation of the auxiliary member. That is, the circumferential length of the seal member is virtually increased by the insertion of the auxiliary member. Therefore, a portion of the seal member in the vicinity of each of the first end face and the second end face is easily deformable into a shape that conforms to the inner peripheral surface of the housing member.

In an example (aspect 3) of aspect 1 or aspect 2, the auxiliary member is an elongated member including a first portion and a second portion, the installing of the auxiliary member includes inserting the auxiliary member between the first end face and the second end face by moving the auxiliary member in an axial direction with the first portion leading, and the first portion is thinner than the second portion. In the above aspect, the first portion positioned forward when the auxiliary member is inserted is thinner than the second portion positioned rearward. Therefore, the auxiliary member is easily inserted between the first end face and the second end face.

In an example (aspect 4) of aspect 3, a planar shape of a leading end face of the auxiliary member is a shape in which a lateral width at a first radial position is smaller than a lateral width at a second radial position radially outward of the first radial position. In the above aspect, the lateral width of the radially inner portion of the leading end face of the auxiliary member is smaller than the lateral width of the radially outer portion. Therefore, the radially inner portion of the leading end face of the auxiliary member can be easily inserted between the first end face and the second end face. The leading end face of the auxiliary member is, for example, an isosceles triangle in which the apex angle is located at a radially inner position.

In an example (aspect 5) of any one of aspects 1 to 4, the method further includes removing the auxiliary member after accommodating the shaft member inside the inner space. In the above aspect, the auxiliary member is removed after the shaft member is accommodated, so that a space is secured between the first end face and the second end face. The space between the first end face and the second end face can absorb dimensional errors of the housing member and the shaft member. Furthermore, by being removed, the auxiliary member can be used for manufacturing more than one sealing structure. Accordingly, the manufacturing cost of the sealing structure can be reduced, as compared with a configuration in which the auxiliary member remains installed between the first end face and the second end face, i.e., the auxiliary member, needs to be separately prepared for each sealing structure.

In an example (aspect 6) according to any one of aspects 1 to 5, with the auxiliary member disposed between the first end face and the second end face, an inner wall face of the auxiliary member is located radially outward of an inner peripheral surface of the seal member. In a configuration in which the inner wall face of the auxiliary member protrudes radially inward from the inner peripheral surface of the seal member, there is a possibility that the shaft member may collide with the auxiliary member in the step of accommodating the shaft member in the inner space. According to a configuration in which the inner wall face of the auxiliary member is located radially outward of the inner peripheral surface of the seal member, the probability is reduced that the shaft member will collide with the auxiliary member in the step of installing the shaft member. That is, the shaft member can be easily accommodated into the inner space without being interfered with by the auxiliary member.

In an example (aspect 7) according to any one of aspects 1 to 6, the sealing member includes: a first surface facing an inner peripheral surface of the housing member; a first protrusion portion protruding from the first surface along the first end face; and a second protrusion portion protruding from the first surface along the second end face, in which a groove portion along an axial direction is formed on the inner peripheral surface of the housing member, and with the auxiliary member disposed between the first end face and the second end face, the first protrusion portion and the second protrusion portion are located inside the groove portion. In the above aspect, the first protrusion portion and the second protrusion portion are located inside the groove portion formed on the inner peripheral surface of the housing member. Therefore, it is possible to restrict the circumferential position (rotation angle) of the seal member, that is, its positioning in the rotational direction.

In an example (aspect 8) of the seventh aspect, the groove portion includes a first wall face and a second wall face facing each other, with a space therebetween in a circumferential direction, and with the auxiliary member installed, the first protrusion portion is in contact with the first wall face, and the second protrusion portion is in contact with the second wall face. In the above aspect, the first protrusion portion of the seal member is in contact with the first wall face of the groove portion, and the second protrusion portion is in contact with the second wall face of the groove portion. Accordingly, the circumferential position (rotation angle) of the seal member is easily restricted, as compared with a configuration in which the first protrusion portion and the first wall face are positioned to face each other with a space therebetween, or a configuration in which the second protrusion portion and the second wall face are positioned to face each other with a space therebetween.

A sealing structure according to an aspect (aspect 9) of the present disclosure includes: a housing member having an inner space; a shaft member accommodated in the inner space; a sealing member including a first end face and a second end face located on opposite sides to each other, and disposed between an inner peripheral surface of the housing member and an outer peripheral surface of the shaft member, while being in a curved state such that the first end face and the second end face are close to each other; and an auxiliary member disposed between the first end face and the second end face.

DESCRIPTION OF REFERENCE SIGNS

100 . . . valve device, 10 . . . shaft member, 11 . . . outer peripheral surface, 12 . . . opening, 20 . . . housing member, 21 . . . inner peripheral surface, 22 . . . opening, 23 . . . groove portion, 231 . . . first wall face, 232 . . . second wall face, 233 . . . bottom face, 30 . . . sealing member, 31 . . . base member, 32 . . . first bead, 33 . . . second bead, 34 . . . first protrusion portion, 341 . . . outer wall face, 342 . . . second protrusion portion, 351 . . . outer wall face, 352 . . . inner wall face, 36 . . . opening, 50 . . . auxiliary member, 51 . . . first portion, 511 . . . first inclined face, 512 . . . second inclined face, 52 . . . second portion, 521 . . . first side face, 522 . . . second side face, 53 . . . leading end face, 54 . . . outer wall face, 55 . . . inner wall face, and S . . . inner space.

What is claimed is:

1. A method of manufacturing a sealing structure comprising:

preparing a flat plate-shaped seal member having a first end face and a second end face located at opposite ends of the seal member;

accommodating the seal member in an inner space of a housing member such that the seal member is deformed into a curved state, with the first end face and the second end face positioned close to each other;

installing an auxiliary member to be in contact with the first end face and the second end face between the first end face and the second end face; and accommodating a shaft member inside the seal member, wherein after accommodating the seal member and before installing the auxiliary member, the seal member is in a teardrop shape in a plan view, and wherein after installing the auxiliary member, the seal member is reshaped into an arc shape that extends along an inner peripheral surface of the housing member.

2. The method of manufacturing the sealing structure according to claim 1, wherein in the installing of the auxiliary member, by installing the auxiliary member, a distance between the first end face and the second end face is increased relative to the distance prior to installation of the auxiliary member.

3. The method of manufacturing the sealing structure according to claim 1, wherein the auxiliary member is an elongated member including a first portion and a second portion, wherein the installing of the auxiliary member includes inserting the auxiliary member between the first end face and the second end face by moving the auxiliary member in an axial direction with the first portion leading, and wherein the first portion is thinner than the second portion.

4. The method of manufacturing the sealing structure according to claim 3, wherein a planar shape of a leading end face of the auxiliary member is a shape in which a lateral width at a first radial position is smaller than a lateral width at a second radial position radially outward of the first radial position.

5. The method of manufacturing the sealing structure according to claim 1, further comprising:

removing the auxiliary member after accommodating the shaft member inside the inner space.

6. The method of manufacturing the sealing structure according to claim 1, wherein, with the auxiliary member disposed between the first end face and the second end face, an inner wall face of the auxiliary member is located radially outward of an inner peripheral surface of the seal member.

7. The method of manufacturing the sealing structure according to claim 1, wherein the seal member includes:

a first surface facing the inner peripheral surface of the housing member;

a first protrusion portion protruding from the first surface along the first end face; and a second protrusion portion protruding from the first surface along the second end face, wherein a groove portion along an axial direction is formed on the inner peripheral surface of the housing member, wherein, with the auxiliary member disposed between the first end face and the second end face, the first protrusion portion and the second protrusion portion are located inside the groove portion.

8. The method of manufacturing the sealing structure according to claim 7, wherein the groove portion includes a first wall face and a second wall face facing each other, with a space therebetween in a circumferential direction, wherein, with the auxiliary member installed, the first protrusion portion is in contact with the first wall face, and the second protrusion portion is in contact with the second wall face.

9. A sealing structure comprising:

a housing member having an inner space;

a shaft member accommodated in the inner space;

a seal member including a first end face and a second end face located on opposite sides to each other, and disposed between an inner peripheral surface of the housing member and an outer peripheral surface of the shaft member, while being in a curved state such that the first end face and the second end face are close to each other; and an auxiliary member disposed between the first end face and the second end face, wherein before the auxiliary member is installed between the first end face and the second end face, the seal member is in a teardrop shape in a plan view, and after the auxillary member is installed between the first end face and the second end face the seal member is reshaped into an arc shape that extends along the inner peripheral surface of the housing member.

* * * * *